United States Patent [19]
Fries

[11] 3,933,312
[45] Jan. 20, 1976

[54] GATING ARRANGEMENT FOR THE MOULDING WORKING OF PLASTICS FORMED FROM A PLURALITY OF FLUID CONSTITUENTS

[75] Inventor: Bernd Fries, Volkach, Germany

[73] Assignee: Messrs. DEMAG Kunstofftechnik GmbH, Nurnberg, Germany

[22] Filed: Apr. 23, 1974

[21] Appl. No.: 463,397

[30] Foreign Application Priority Data
Apr. 26, 1973 Germany............................ 2321153

[52] U.S. Cl. ................ 239/413; 239/533; 239/562; 425/130; 425/245 R; 425/817 R; 425/DIG. 224
[51] Int. Cl.² .......................................... B05B 12/08
[58] Field of Search ........... 239/410, 412, 411, 413, 239/533, 536, 452, 599, 562, 570; 137/625.4; 425/130, 131, 245 R, 245 NS, DIG. 224, DIG. 225

[56] References Cited
UNITED STATES PATENTS

| | | | |
|---|---|---|---|
| 3,160,212 | 12/1964 | Reid | 239/533 X |
| 3,537,653 | 11/1970 | Jones | 239/533 |
| 3,598,322 | 8/1971 | Rupert et al. | 239/410 |
| 3,716,318 | 2/1973 | Erik | 425/245 R |
| 3,799,199 | 3/1974 | Rumpff | 425/245 R |

*Primary Examiner*—John J. Love

[57] ABSTRACT

A gating arrangement for use in moulding plastics, particular foam plastics, formed from a plurality of fluid constituents comprises a plurality of nozzles for delivering the constituents under pressure into a mixing chamber. A nozzle needle is associated with each nozzle and is movable between positions which close and open the nozzles. The nozzle needles are moved from the closing position into the opening position by the pressure of the fluid constituents. A hydraulic piston is associated with each nozzle needle for retaining each nozzle needle in a definite position.

9 Claims, 1 Drawing Figure

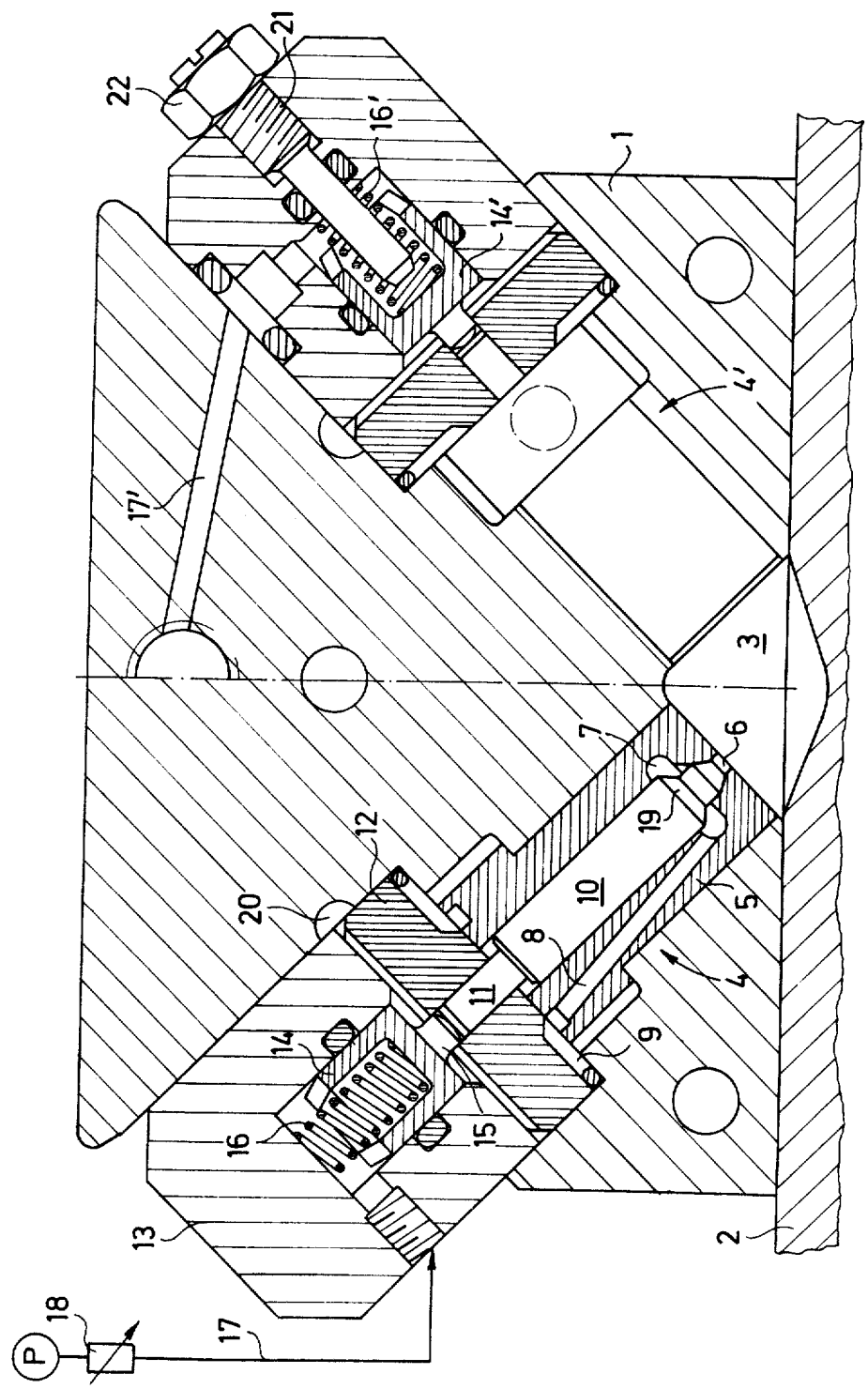

GATING ARRANGEMENT FOR THE MOULDING WORKING OF PLASTICS FORMED FROM A PLURALITY OF FLUID CONSTITUENTS

The invention relates to a gating arrangement for the moulding working of plastics, in particular cell-forming plastics, formed from a plurality of fluid constituents, comprising a plurality of closable nozzles delivering under pressure into a mixing chamber for the constituents and the closing elements of which are held in the closed position by a hydraulic piston and are adapted to be brought into the open position by the pressure of the constituents.

A gating arrangement of the above-described type is known, for example, from German Laid-open Pending Patent Application No. 2,112,353. In this arrangement, the constituents to be mixed are conveyed into the mixing chamber via needle nozzles to the needles of which pressure is applied at their rear ends by thrust pins which can be actuated in turn by a common hydraulic piston via a rocker lever system. When hydraulic pressure is applied to the hydraulic piston, the thrust pins force the nozzle needles against the nozzle orifices and close them. If the mixing and gating operation is to be initiated, the hydraulic pressure loading the hydraulic piston is removed or considerably lowered, so that the pressure of the plastics constituents operative in the nozzles displaces the nozzle needles suddenly into the open position, which is defined by an infinitely adjustable limiting stop.

The adjustable limiting stop for the nozzle needles permits precise adaptation of the needle stroke to the delivery conditions and the properties of the plastics constituents to be delivered, for example to the delivery effected per unit of time and the viscosity, for the purpose of obtaining a rate of exit of the constituents from the nozzles which is optimum for the mixing operation in a given instance. The disadvantage involved, however, is that on a change in the quantity of the constituents which is delivered, which may be necessary, for example, when a different constituent is used, or when there are changes in the viscosity of the constituents, such as frequently occur in consequence of variations of temperature, the rate of exit from the nozzle and the pressure drop between the nozzle inlet and outlet change. With a view to as intensive a mixing of the constituents as possible, however, these factors should always retain a value which is the optimum for this purpose. In such cases, therefore, the stroke of the nozzle needle must always be adjusted afresh and sometimes changes in viscosity due to temperature and the resulting impairment of the mixing process do not become perceptible or become perceptible only because of corresponding defects in the finished product.

The problem underlying the invention, therefore, is to propose an arrangement of the kind described at the beginning with which it is possible to keep the rate of exit of the plastics constituents from the nozzles and the pressure drop at the nozzles always at an optimum value for the mixing process even when variations in the delivery conditions or the properties of the constituents being delivered remain unrecognized. According to the invention, this problem is solved in that with each of the closing elements of the nozzles there is associated a hydraulic piston to which there is applied during the gating operation a predetermined pressure against the force effect of which the pressure of the constituents opens the closing elements.

Since the pressure drop via the nozzle is a function of the effective flow cross-section available through the nozzle orifice, the delivery effected and the viscosity and, consequently, the constituent pressure operative in front of the nozzle orifice is clearly linked with the stroke of the closing element, an opening stroke of the closing element adjusts itself which is defined at all times by the equilibrium between the thrust applied by the hydraulic piston to the closing element and the thrust acting in the opposite directed as a result of the constituent pressure. If one of the determinative quantities, the delivery or viscosity, changes or both change, a new position of equilibrium of the closing element adjusts itself accordingly.

Advantageously, the pressure acting on the hydraulic piston is adjustable. In this way, it is possible, taking appropriate account of the pressure surfaces operative against each other on the hydraulic piston and the closing element, to preselect the optimum mixing pressure itself directly. This mixing pressure and the rate of outflow associated therewith are then maintained automatically.

In a suitable constructional form of the arrangement according to the invention each hydraulic piston is guided in a cylinder coupled to the nozzle housing and presses directly on the end of the associated closing element. Of course, instead of using separate hydraulic pistons, it is possible to form them in one piece with the closing elements, so that the predetermined hydraulic pressure is applied to the closing elements themselves.

Other advantages and features of the present invention will appear from the following description of preferred embodiments given with reference to the accompanying drawing and from additional sub-claims. The drawing is a diagrammatic cross-section through a gating arrangement according to the invention, a modified embodiment of the nozzle construction being shown for the sake of simplicity in the right-hand half of the drawing.

A mixing head 1 is fixedly connected to a mixing plate 2, which may also be the mould itself. The mould, which is not an object of the present invention and therefore does not need to be described in detail, contains a cavity (not shown) and the corresponding runners (likewise not shown). The mixing head 1 forms, together with the mixing plate 2, a mixing chamber 3 from which the runner or runners lead to the mould cavity. In the embodiment shown, the mixing chamber 3 is tetragonal in cross-section and closable nozzles 4 and 4' open on two adjacent sides of the cross-section. During the gating operation, these nozzles deliver fluid plastics constituents under predetermined pressure and at a predetermined rate of outflow into the mixing chamber 3, these constituents flowing further into the mould cavity and solidifying therein in known manner to form a moulding.

The nozzle 4 consists essentially of a nozzle body 5 in one end of which there are formed a nozzle orifice 6 and, in front of the nozzle orifice, a nozzle chamber 7. The nozzle chamber 7 is in communication via a duct 8 with a feed chamber 9 for the particular plastics constituent being delivered, which is pumped into the feed chamber 9 through a feed line (not shown).

A nozzle needle 10 is axially slidable in a central bore in the nozzle body 5, the needle being reduced to a smaller diameter at its rear end and extending in sealing relationship by means of the pin 11 thereby formed into a corresponding bore in a plate 12. The plate 12 forms the front closure of a hydraulic cylinder 13 in which a hydraulic piston 14 is guided and presses by means of a projection 15 in the form of a stud on the end of the pin 11 on the nozzle needle 10. The hydraulic piston 14 is pot-shaped and loaded by a light compression spring 16 in the closing direction of the nozzle needle 10. Pressure can be applied to the hydraulic piston in the same direction by a hydraulic pump P via a line 17, which is shown only diagrammatically, a pressure adjusting element 18 being located in the line.

An annular surface 19 is formed on that zone of the nozzle needle 10 which is located in the nozzle chamber 7. Furthermore there is indicated at 20 a collecting chamber through which any leakages of hydraulic oil and plastics constituents occuring can flow off.

The nozzle 4' shown in the right-hand half of the drawing differs from the nozzle 4 essentially only in that it has a mechanical stroke limiting means for the nozzle needle in the form of a threaded spindle 21 with a corresponding lock nut 22. The front end of the threaded spindle 21 extends into the pot-shaped hydraulic cylinder 14' and forms a stop for the base thereof. At the same time the spindle serves as a guide for the light compression spring 16'. It is a matter of course that advantageously only nozzles of the same design are used in a gating arrangement constructed in practise and that there are only graphic reasons for the different designs of the nozzles in the drawing.

The arrangement according to the invention operates in the following manner:

First of all, by turning on the metering pumps for the plastics constituents, a biasing pressure is built up in the feed conduits and in particular in the nozzle chamber 7, this biasing pressure being at least as high as the pressure drop at the nozzle orifice 6. At this time, a hydraulic pressure is also applied to the hydraulic cylinder 13 via the line 17, the pressure being adjusted at the pressure adjusting element 18 and so determined that it is certain that the nozzle needle 10 cannot be lifted away in the direction of opening by the built-up biasing pressure of the constituent acting on the annular surface 19. The nozzle needle 10 is therefore held positively in the closed position by the hydraulic piston 14.

After the desired biasing pressure of the constituent has been reached, the pressure acting on the hydraulic piston 14 is now lowered to a value which is likewise adjusted at the pressure adjusting element 18 and corresponds to the desired mixing pressure. The nozzle needle 10 is now opened by the pressure of the constituent, the hydraulic piston 14 being also moved until a position of equilibrium of the nozzle needle 10 adjusts itself. This position of equlibrium is defined by the force excerted by the hydraulic piston 14 on one end of the nozzle needle 10, which is compensated by the pressure head building up on the annular surface 19 and the end face of the nozzle needle 10 as the flow begins. It will be understood that the oil pressure acting on the hydraulic piston 14 must be chosen in the ratio of effective needle area to piston area in order to obtain the desired mixing pressure at the respective nozzle outlets. Accordingly, the pressure adjusting element 18 is suitably also calibrated, so that the desired mixing pressure can be adjusted and read off thereat directly via the oil pressure.

As a result of the construction according to the invention, the mixing pressure at the nozzle becomes independent of the quantity delivered and the viscosity of the constituents, since with every change therein the needle stroke also changes (pressure balance principle). At the end of the injection, all the nozzle needles 10 are closed by simultaneous application of pressure to the hydraulic pistons 14 associated with them. The metering pumps for the plastics constituents are thereupon turned off.

In the case of the nozzle construction 4' shown in the right-hand half of the drawing, automatic adjustment of the mixing pressure is effected only below the range defined by the stop (threaded spindle 21).

The stiffness of the compression spring 16 is chosen that its force can be disregarded in the play of forces determining the position of equilibrium of the nozzle needle 10. The effect of this stiffness is merely that a minimum opening pressure must be applied in the nozzles by the plastics constituents.

In addition to the described infinitely variable adjustment of the stroke of the nozzle needle with a corresponding stabilization of the mixing pressure, the arrangement according to the invention also has the advantage, compared with the known gating arrangement, that it is less costly in construction and adjustment technique because of the elimination of the rocker lever system. Owing to the very low control oil requirements of the hydraulic cylinders 13 (about 0.5 cc), a quasi forced control is obtained on the assumption that the pressure oil supply is suitably large. The difference in the individual operating times for the nozzle needles 10 is so small that for practical conditions simultaneous control takes place and no appreciable permature or subsequent escape of plastics constituents from the nozzles occurs.

I claim:

1. A gating arrangement for a plurality of fluid constituents of a plastics material comprising, a plurality of nozzles for delivering said constituents under pressure into a mixing chamber, each nozzle having a nozzle chamber, a closing element sealingly disposed within each nozzle chamber and having an end portion therein and being movable between positions opening and closing its respective nozzle, each closing element being moved, in a first direction of movement, from its closing to its opening position by pressure of said fluid constituents thereon at its end portion, and a hydraulic piston associated with each closing element and urging said closing element in a line of movement opposite to the first line of movement, means for applying hydraulic pressure to said hydraulic piston and urging said piston in its line of movement, thereby maintaining each closing element in a definite position, with respect to said nozzle chamber, on application of a predetermined hydraulic pressure to said piston.

2. An arrangement as claimed in claim 1, wherein said means is adjustable for providing an adjustable hydraulic pressure acting on said hydraulic pistons.

3. An arrangement as claimed in claim 1 wherein each hydraulic piston is guided in a cylinder coupled to a housing surrounding said nozzles and presses directly on its associated closing element at an end remote from said end portion.

4. An arrangement as claimed in claim 3, including a thrust stud on each hydraulic piston and contacting the end of said closing element.

5. An arrangement as claimed in claim 1, wherein said hydraulic pistons are integral with said closing elements.

6. An arrangement as claimed in claim 1, including spring means biasing said hydraulic piston and normally maintaining each closing element in said closing position.

7. An arrangement as claimed in claim 1, including stop means limiting movement of said hydraulic pistons.

8. An arrangement as claimed in claim 1, wherein each closing element has an annular surface at said end portion for receiving the pressure of said constituents.

9. An arrangement as claimed in claim 1 wherein each closing element has a conical tip at its end remote from said hydraulic piston.

* * * * *